US006168884B1

(12) United States Patent
Neudecker et al.

(10) Patent No.: US 6,168,884 B1
(45) Date of Patent: Jan. 2, 2001

(54) BATTERY WITH AN IN-SITU ACTIVATION PLATED LITHIUM ANODE

(75) Inventors: Bernd J. Neudecker; Nancy J. Dudney, both of Knoxville; John B. Bates, Oak Ridge, all of TN (US)

(73) Assignee: Lockheed Martin Energy Research Corporation, Oak Ridge, TN (US)

( * ) Notice: Under 35 U.S.C. 154(b), the term of this patent shall be extended for 0 days.

(21) Appl. No.: 09/285,326

(22) Filed: Apr. 2, 1999

(51) Int. Cl.[7] .................................................. H01M 10/00
(52) U.S. Cl. ........................ 429/162; 429/127; 429/124; 429/163; 429/129; 429/130; 429/231.95; 429/104; 429/246
(58) Field of Search ..................... 429/127, 162, 429/163, 231.95, 129, 130, 104, 246, 124

(56) References Cited

U.S. PATENT DOCUMENTS

| 5,314,765 | 5/1994 | Bates . | |
|---|---|---|---|
| 5,332,906 | 7/1994 | Bates et al. . | |
| 5,338,625 | 8/1994 | Bates et al. . | |
| 5,455,126 | 10/1995 | Bates et al. . | |
| 5,512,147 | 4/1996 | Bates et al. . | |
| 5,561,004 | * 10/1996 | Bates et al. ......................... | 429/162 |
| 5,567,210 | 10/1996 | Bates et al. . | |
| 5,569,520 | * 10/1996 | Bates ..................................... | 429/162 |
| 5,597,660 | 1/1997 | Bates et al. . | |
| 5,612,152 | 3/1997 | Bates ..................................... | 429/152 |
| 5,871,865 | 2/1999 | Barker et al. ......................... | 429/223 |

FOREIGN PATENT DOCUMENTS

| 0 829 913 A2 | 3/1998 | (EP) | ............................. | H01M 10/36 |
| 2 251 119 | 6/1992 | (GB) | ............................. | H01M 4/50 |
| WO 95/14311 | 5/1995 | (WO) | ............................. | H01M 6/18 |

* cited by examiner

*Primary Examiner*—Maria Nuzzolillo
*Assistant Examiner*—Angela J. Martin
(74) *Attorney, Agent, or Firm*—Wilson, Sonsini, Goodrich & Rosati

(57) ABSTRACT

A thin-film rechargeable battery includes a cathode film; including a lithium transition metal oxide, an electrolyte film coupled to the cathode film, the electrolyte film being substantially nonreactive with oxidizing materials and with metallic lithium, an anode current collector coupled to the electrolyte film; and an overlying layer coupled to the anode current collector. The thin-film rechargeable battery is activated during an initial charge by electrochemical plating of a metallic lithium anode between the anode current collector and the electrolyte film. The plating of the anode during charging and the stripping of the anode layer during discharging are essentially reversible. Therefore, almost no diminishment of discharge capacity occurs, even after many discharge and charge cycles. Other advantages include no need for special packaging for shipping and handling. The battery eliminates the main drawbacks of the thin-film Li-ion battery (high capacity loss during the initial charge) and of the thin-film lithium battery (high air-sensitivity at all times, temperature limited to ~100° C., expensive preparation of the lithium anode). The battery survives processing conditions that exceed those of a solder reflow process without any signs of degradation.

13 Claims, 6 Drawing Sheets

BATTERY WITH AN IN-SITU ACTIVATION PLATED LITHIUM ANODE

BACKGROUND OF THE INVENTION

1. Field of the Invention

The invention relates generally to the field of batteries. More particularly, the invention relates to a rechargeable thin-film battery that produces a lithium anode via plating onto the anode current collector during initial use (activation) of the battery.

2. Discussion of the Related Art

The capacities of rechargeable lithium-ion batteries are presently limited by the positive cathode, which serves as the lithium source during the initial charge. The reason for the limitation lies in the significantly smaller reversible capacity of the cathode material, such as $LiCoO_2$ (140 milli-ampere-hour per gram (mAh/g)), $LiNiO_2$ (190 mAh/g), $LiMn_2O_4$ (110 mAh/g), or $LiMnO_2$ (180 mAh/g), compared to the "best" anode materials such as carbons and tin oxide and its derivatives. These anodes, in particular the tin oxide based materials, have the unfortunate characteristic of consuming a significant amount of lithium during the initial charge of the lithium-ion (Li-ion) battery. For an optimal battery system, the irreversible charge/discharge capacity loss of a selected anode material should be as small as possible in order to utilize as much of the cathode as possible.

Although considered the best anode material for thin-film batteries as far as electrochemical performance and the minimal initial capacity loss are concerned, the lithium metal anode has two major drawbacks. First, the deposition of lithium metal complicates the fabrication process of the battery and the as-fabricated air-sensitive lithium battery needs special packaging for shipping and handling. Second, due to the low melting point of lithium (181° C.), such a lithium battery is practically limited to about 100° C. and does not survive the temperatures of about 250° C. associated with the solder re-flow process, which is commonly used to assemble integrated circuits.

SUMMARY OF THE INVENTION

To avoid the inherent capacity loss of lithium-ion (Li-ion) batteries and circumvent the fabrication of a lithium metal anode, it is highly desirable to prepare a lithium battery precursor with "no" anode at all. To this end a lithium metal anode can be formed in-situ during the initial charge by plating lithium on an anode current collector, which does not form inter-metallic compounds with lithium. The anode current collector is sandwiched between a solid state electrolyte and an overlying layer.

A first aspect of the invention is implemented in an embodiment that is based on a thin-film rechargeable battery comprising a cathode film including a lithium transition metal oxide; an electrolyte film coupled to the cathode film; the electrolyte film being substantially nonreactive with oxidizing materials and with metallic lithium, an anode current collector coupled to the electrolyte film; and an overlying layer coupled to the anode current collector, wherein the thin-film rechargeable battery is activated during a charge by electrochemical plating of a metallic lithium anode between the anode current collector and the electrolyte film.

A second aspect of the invention is implemented in an embodiment that is based on method for forming a thin-film battery comprising providing a substrate, depositing a cathode current collector on the substrate, depositing a cathode film on the cathode current collector where the cathode film includes a lithium transition metal oxide, depositing an electrolyte film on the cathode film, depositing an anode current collector on the electrolyte film, and depositing an overlying layer on the anode current collector.

The term coupled, as used herein, is defined as connected, although not necessarily directly, and not necessarily mechanically. The term substantially, as used herein, is defined as approximately (e.g., preferably within 10% of, more preferably within 1% of, most preferably within 0.1% of).

These, and other, goals and aspects of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawings accompanying and forming a part of this specification. It should be noted that the features illustrated in the drawings are not necessarily drawn to scale.

FIG. 1B after activation), representing an embodiment of the invention.

DESCRIPTION OF PREFERRED EMBODIMENTS

Figure 1A:
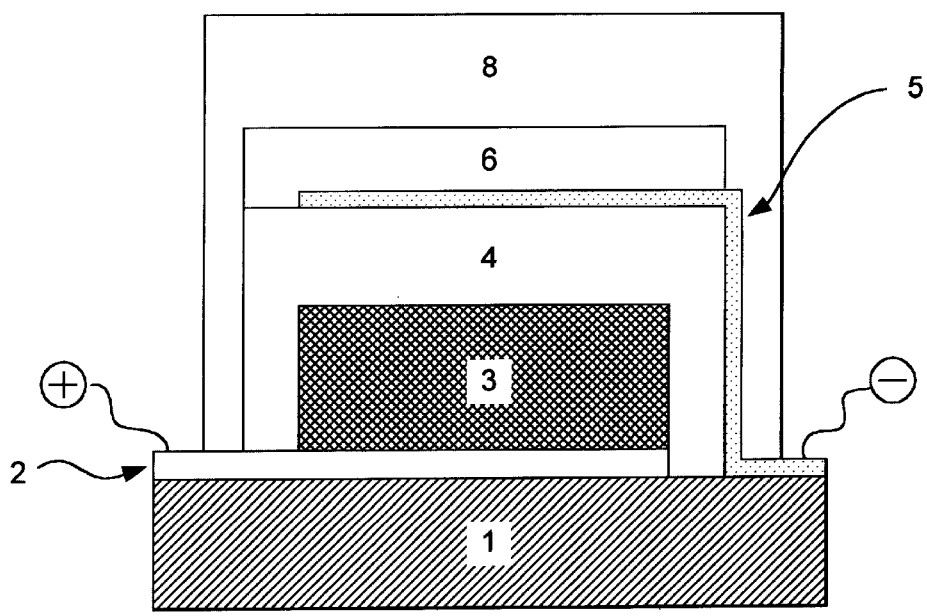
FIGS. 1A and 1B show two schematic views of a battery (FIG. 1A before activation.

A rechargeable thin-film battery according to the invention is referred to herein as a battery with an in-situ activation plated anode. The invention and the various features and advantageous details thereof are explained more fully with reference to the non-limiting embodiments that are illustrated in the accompanying drawings and detailed in the following description of preferred embodiments. Descriptions of well-known components and processing techniques are omitted so as not to unnecessarily obscure the invention in detail.

The battery with an in-situ activation plated anode is provided in an as-fabricated state including a cathode, an electrolyte film, an anode current collector, and an overlying layer. The cathode can be made of $LiCoO_2$, $LiMn_2O_4$ etc. The electrolyte film is made of a solid inorganic material. This solid inorganic material can be Lipon. Lipon is defined herein as lithium phosphorus oxynitride, which is an amorphous inorganic compound having an optimal stoichiometry of approximately $Li_{2.9}PO_{3.3}N_{0.46}$. Lipon and lithium batteries are described by U.S. Pat. Nos. 5,612,152; 5,597,660; 5,569,520; 5,567,210; 5,561,004; 5,512,147; 5,455,126; 5,338,625; 5,332,906; and 5,314,765, all of which are incorporated herein in their entirety.

The thin-film metal anode current collector does not form inter-metallic compounds with lithium, and can be made of Sc, Ti, V, Cr, Mn, Fe, Co, Ni, Cu, Y, Zr, La, Hf, Ta, Mo etc., and alloys thereof. The thin-film metal anode current collector is directly deposited onto a solid inorganic electrolyte film, such as Lipon. The overlying layer can also be made of Lipon.

The battery in the as-fabricated state has no anode material. In the as-fabricated state, the battery is not air-sensitive. The battery in this state survives heating at 250° C. in air for 10 minutes without charge/discharge capacity degradation. This heating is comparable to that encountered in conventional solder re-flow techniques.

The battery is activated during an initial charging of the battery. During the initial charging the in-situ activation plated anode is formed by electrochemical plating of metallic lithium on the anode current collector which is located between the electrolyte layer and the overlying layer. The lithium metal can be reversibly deposited and removed by plating and stripping of metallic lithium metal from the electrolyte/anode current collector interface without any signs of degradation. During the deposition and removal of lithium metal the anode current collector along with the overlayer is lifted up and set down from/onto the electrolyte layer, respectively.

This process becomes highly reversible only when an overlying film is deposited onto the anode current collector. Then, the battery with an in-situ activation plated anode performs as a lithium thin-film battery that is configured with the respective cathode. The coulombic efficiency of the lithium metal plating and stripping process approaches 100% when the lithium metal is completely stripped during discharge of the battery.

Figure 1B:
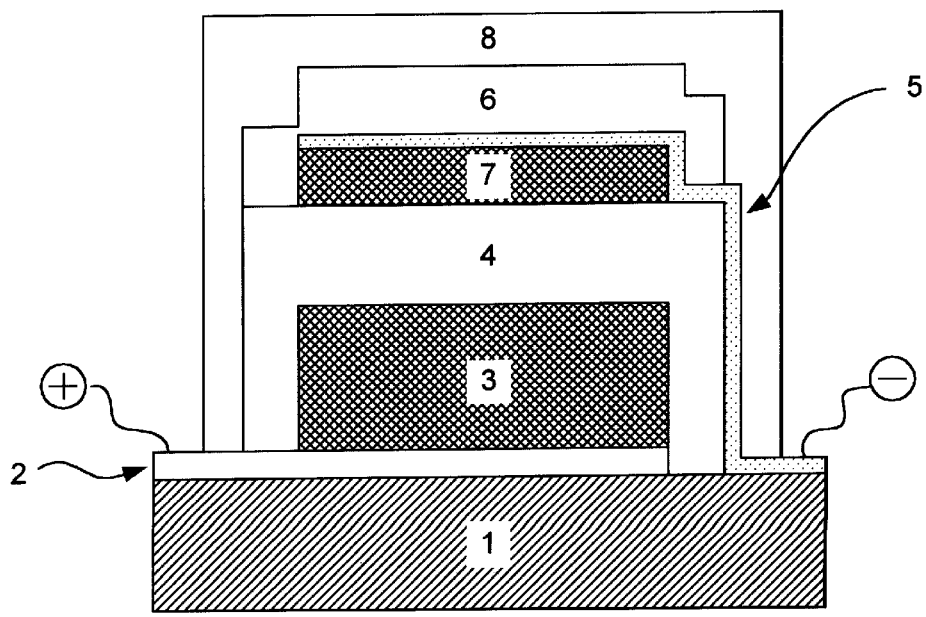

FIGS. 1A–1B illustrate schematic views of the battery of the present invention at different charge states. Typically, a cathode current collector 2, such as gold or platinum, approximately 3000 Å thick, is deposited onto an alumina substrate 1 by sputtering of the respective metal target in argon. The alumina substrate 1 can be replaced by other ceramic substrates suitable for thin film batteries such as silica, zirconia, or AlN (aluminum nitride), by semiconductors such as silicon or germanium, by a metal foil (Al, Ti, stainless steel, etc.), or in some cases (see below) by a plastic substrate.

A cathode film 3, that is from approximately 0.01 to 5 microns thick, and made of a lithium transition metal oxide such as $LiCoO_2$ or $LiMn_2O_4$, is deposited over the cathode current collector 2 by physical or chemical thin-film techniques, such as sputtering, electron beam evaporation, CVD, etc. After deposition of cathode film 3 and collector 2, the substrate 1 is placed in a furnace and heated in air or in a flowing gas atmosphere of $O_2$, $N_2$, Ar, $H_2$, or mixtures thereof, to a temperature of from approximately 400 to 900° C. in order to crystallize the cathode film 3 and adjust its stoichiometry. The cathode film 3 can also be used in an as-deposited amorphous state with no subsequent heat treatment after deposition in which case the battery can be fabricated on a plastic substrate.

An electrolyte film 4, approximately 1–2 microns thick, can be made of lithium phosphorus oxynitride deposited over the cathode film 3 by radio frequency magnetron sputtering of a $Li_3PO_4$ target in $N_2$ at pressures between approximately 3 to 20 mTorr at a deposition rate of approximately 10–200 Å/min. Lithium phosphorus oxynitride provides the desired properties of a lithium electrolyte, including stability against metallic lithium, and stability against the cathodes (up to 5.5 volts versus lithium). Lithium phosphorus oxynitride also provides a low Li+ion resistance of approximately 50 ohms per square centimeter for a one-micrometer film, and an Li+ ion transport number of unity, (i.e., Li+ is the only mobile species).

An anode current collector 5, approximately 0.005 to 20 microns, preferably approximately 0.05 to 2 microns thick, is deposited on top of the electrolyte film 4. The anode current collector 5 is made of a material that, in general, does not form inter-metallic compounds with lithium. Examples include scandium, titanium, vanadium, chromium, manganese, iron, cobalt, nickel, copper, yttrium, zirconium, lanthanum, hafnium, molybdenum, tantalum, tungsten, or titanium nitride, etc. The anode current collector 5 should be thermodynamically stable with regard to a plated lithium metal 7.

Finally, an overlying layer 6 is deposited over the anode current collector 5. This overlying layer 6 can approximately range from approximately 0.01 to 30 microns, preferably from approximately 0.1–3 $\mu$m in thickness. The overlying layer 6 can exert a mechanical pressure similar to a spring load on the anode current collector 5 so as to accommodate large volume changes during the plating (battery charge) and stripping (battery discharge) of lithium. The overlying layer can be made of a material such as lithium phosphorus oxynitride, aluminium nitride, etc. Some preferred embodiments use aluminium nitride.

The overlying layer 6 provides a limited reaction with metallic lithium, and forms an impervious barrier to transport of atomic lithium. The overlying layer also acts as an electronic insulator, and maintains a smooth flat interface upon accumulation of the underlying, electrochemically plated lithium anode. Lithium phosphorus oxynitride provides these desired overlying layer properties.

The sandwich structure of the battery with an in-situ activation plated anode includes the electrolyte film 4 on the bottom, the anode current collector 5 in the middle, and the overlying layer 6. The sandwich structure is configured to ensure that the electrochemically plated lithium metal 7 is confined to a predetermined geometry. The sandwich structure also prevents formation of a fluffy or mossy lithium morphology that is commonly observed when plating lithium metal onto metal current collectors that do not form inter-metallic compounds with lithium.

Since the as-fabricated battery does not contain any air-sensitive anode material, the battery can be handled for hours in ambient conditions, or more preferably in a dry environment without the need for any protective coating. In order to ensure a long shelf life, the battery can be hermetically sealed inside a plastic bag or any other suitable container, or optionally a protective coating 8 that is impervious to moisture and does not react with the overlying layer 6. Protective coating 8 can be directly deposited onto the battery. For the plastic bag or the protective coating, plastic films such as polytetrafluoroethylene, polyethylene, parylene, etc., can be used. During operation, the battery with an in-situ activation plated anode can be hermetically sealed by ultraviolet-cured epoxy (not shown) or a ceramic cap (not shown) such as sintered AlN, $Si_3N_4$ etc., which, in this case, makes the protective coating 8 unnecessary.

Alternate Embodiments

Alternate embodiments of the battery include those that incorporate very thin-film anode current collectors, that do not form further inter-metallic compounds with lithium after being saturated with lithium during battery charge. After saturation, these anode current collectors virtually convert into lithium metal due to the very high concentration of lithium compared to the constituent element in the anode current collectors. Examples of such anode current collectors include Mg, Ca, Sr, Ba, B, Al, Ga, In, Tl, C, Si, Ge, Sn, Pb, Sb, Bi, Zn, Pd, Ag, Cd, Pt, Au etc., and alloys thereof. In addition, typical anode compounds such as SnO, $SnO_2$, SiTON, $Li_4Ti_5O_{12}$ can be used as the very thin lithium-alloying layer. SiTON is defined herein as silicon tin oxynitride and is an amorphous, inorganic compound having a stoichiometry $Si_aSn_bO_yN_z$ where a+b=2, y is less than or equal to 4, and z is larger than zero, but less than or equal to 2.67. A typical SiTON composition is $SiSn_{0.9}ON_{1.9}$, although one important SiTON composition is $SnN_{1.33}$.

The overlying layer 6 can be replaced by other films showing the required electrical, chemical and mechanical properties. Examples of such films include BeO, MgO, CaO, SrO, BaO, BN, AlN, $SiO_2$, $Si_3N_4$, $Si_2N_2O$, $Sc_2O_3$, $Y_2O_3$, $La_2O_3$, $ThO_2$, $Li_2Be_2O_3$, $Li_4BeO_3$, $Li_5AlO_4$, $Li_4SiO_4$, $Li_8SiO_6$, $LiScO_2$, $LiYO_2$, $Li_8ZrO_6$, $LiCeO_2$, LiF, LiCl, LiBr, LiI, and derivatives thereof.

Also, the overlying layer 6 can be replaced by other films that form an impervious barrier to transport of atomic lithium while maintaining a smooth flat interface for accumulation of the underlying, electrochemically plated lithium anode. Metals in which lithium shows virtually no solubility, such as Be, Zr, Ta, W etc., and alloys thereof can be used. In addition, plastics such as polytetrafluoroethylene, polyethylene, parylene etc. can be utilized in film form for this purpose.

The particular material selected for the various layers of the battery with an in-situ activation plated anode is not essential to the invention, as long as each of the materials provides the described function. Normally, those who make or use the invention will select the best commercially available material based upon the economics of cost and availability, the expected application requirements of the final product, and the demands of the overall manufacturing process.

The particular manufacturing process used for the battery with an in-situ activation plated anode should be inexpensive and reproducible. Conveniently, manufacture of a battery with an in-situ activation plated anode of the invention can be carried out by using many different deposition methods for the various layers.

However, the particular manufacturing process used for the battery with an in-situ activation plated anode is not essential to the invention as long as it provides the described functionality. Normally, those who make or use the invention will select the manufacturing process based upon tooling and energy requirements, the expected application requirements of the final product, and the demands of the overall manufacturing process.

EXAMPLES

Specific embodiments of the invention will now be further described by the following, non-limiting examples which serve to illustrate in some detail various features of significance. The examples are intended merely to facilitate an understanding of ways in which the invention may be practiced and to further enable those of skill in the art to practice the invention. Accordingly, the examples should not be construed as limiting the scope of the invention.

Example 1

Copper Anode Current Collector

Figure 2:
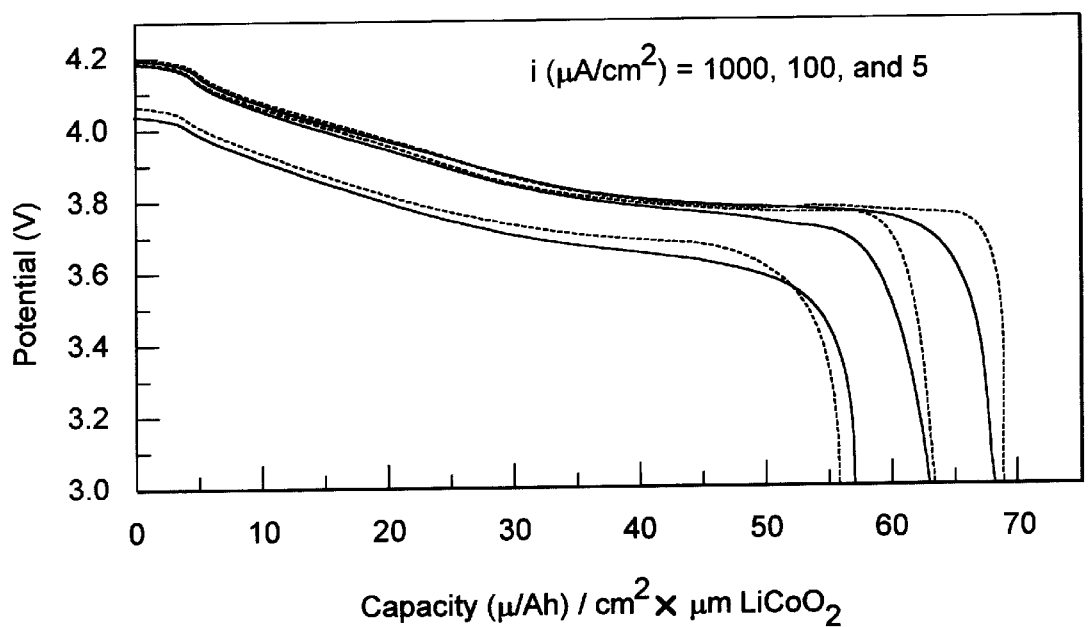
FIG. 2 shows a comparison of the discharge rate capability of a conventional thin-film lithium battery (dashed lines) with a battery having an in-situ plated lithium anode (solid lines), representing an embodiment of the invention.

FIG. 2 shows a comparison of the rate capability of a battery with an in-situ activation plated lithium anode (solid lines) and a conventional lithium battery (dashed lines), cycled between 4.2 volts and 3.0 volts. The voltage window varies with the choice of cathode material; $LiMn_2O_4$ (4.5–2.8V), $LiNO_2$ (4.2–2.5v), $LiV_2O_5$ (3.6–2.5V), etc. Each of the batteries had an area of one square centimeter. The battery with an in-situ activation plated lithium anode had a one micron thick Lipon overlying layer, a thousand angstrom thick copper anode current collector, a two micron thick Lipon electrolyte film, a one micron thick $LiCoO_2$ cathode film, and an in-situ plated lithium anode. The conventional lithium battery had a three-micron thick lithium anode, a one micron thick Lipon electrolyte layer, and a one micron thick $LiCoO_2$ cathode film.

The battery with an in-situ activation plated lithium anode was activated during the initial charge. During the initial charge, metallic lithium was plated between the anode current collector and the Lipon electrolyte layer. The capacity is given in units of microampere hours ($\mu Ah$) per unit of area and per micrometer thickness of $LiCoO_2$ cathode.

Figure 3:
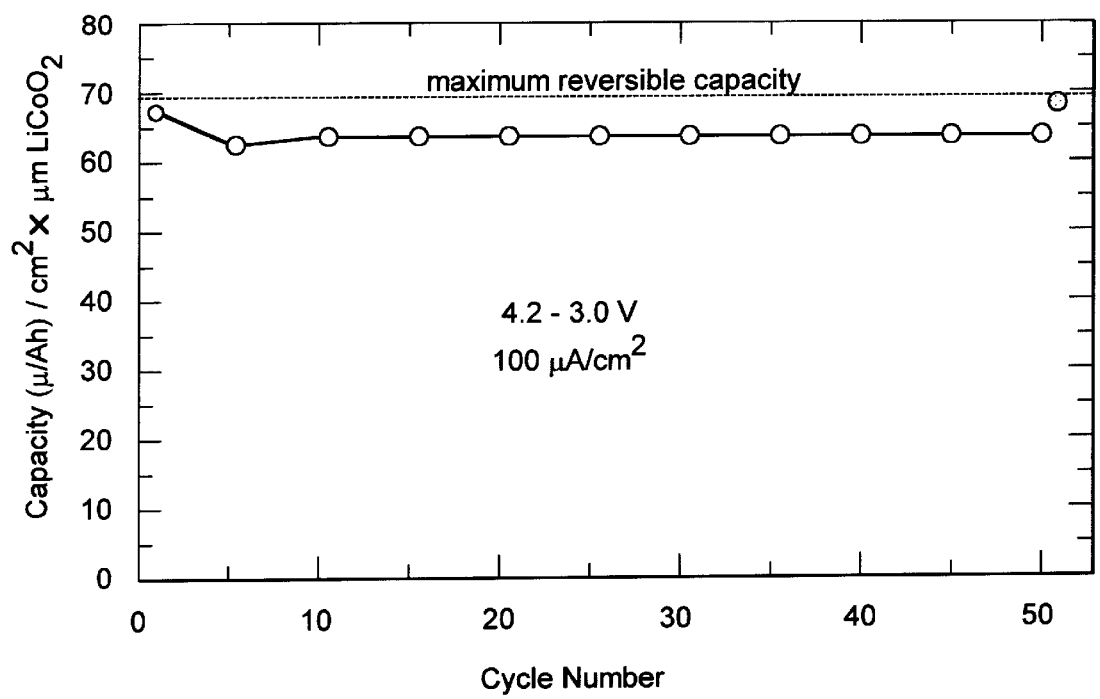
FIG. 3 shows the discharge capacity as a function of cycle number for a battery having an in-situ plated lithium anode, representing an embodiment of the invention.

The cycle performance as a function of voltage window and cycle number is illustrated in FIG. 3 for one embodiment of the invention. FIG. 3 shows the discharge capacity of a 1 $cm^2$ battery with in-situ plated lithium anode of the construction 1 $\mu m$ Lipon/1000 Å Cu /2 $\mu m$ Lipon/1.0 $\mu m$ $LiCoO_2$ as a function of cycle number. The battery was heated at 250° C. in air for 10 minutes prior to the initial charge in order to simulate a heat treatment that exceeds the conditions encountered during a solder re-flow process. The battery with in-situ plated lithium anode was cycled between 4.2 volts and 3.0 volts. In this voltage range, virtually all of the reversible cycled lithium was stripped and re-plated underneath the copper anode current collector during discharge and charge of the battery, respectively. The data shows that almost the entire amount of lithium that was plated during the initial charge can be reversibly cycled. With this complete lithium turnover, the cycle stability remains excellent and shows no measurable capacity loss after 50 cycles in this voltage range. When operated at a low current density of 5 $\mu A/cm^2$, the battery with an in-situ activation plated lithium anode nearly yields the theoretical limit of 100% cathode utilization, which is fixed at 69 $\mu A/h$ per $cm^2$ for a 1.0 $\mu m$ thick $LiCoO_2$ cathode.

The capacity supplied by the example 1 battery at 5 $\mu A/cm^2$ between 4.2 volts and 3.0 volts is represented by the filled circle at cycle no. 51 in FIG. 3. This capacity is readily compared with the maximum reversible capacity of a battery equipped with a 1 $cm^2$ by 1 $\mu m$ large $LiCoO_2$ cathode indicated in FIG. 3 by the dashed line. This comparison clearly demonstrates the unexpected excellent reversibility of the lithium stripping and plating process for batteries with in-situ activation plated lithium anodes. Also, note that the coulombic efficiency, i.e., the ratio of discharge capacity and charge capacity of the preceding half-cycle, is nearly 100%.

As previously mentioned, the battery with an in-situ activation plated lithium anode shown in FIG. 3 was heated at 250° C. for 10 minutes in air prior to the initial charge. This heat treatment exceeds the conditions encountered during a solder re-flow process, and the reversible capacity supplied at the given current density of 100 $\mu$A/cm$^2$ is virtually the same as for unheated conventional Li/LiCoO$_2$ thin-film batteries. Therefore, the battery with an in-situ activation plated lithium anode is shown to be capable of surviving a solder re-flow assembly without any signs of degradation in cell performance.

Figure 4:
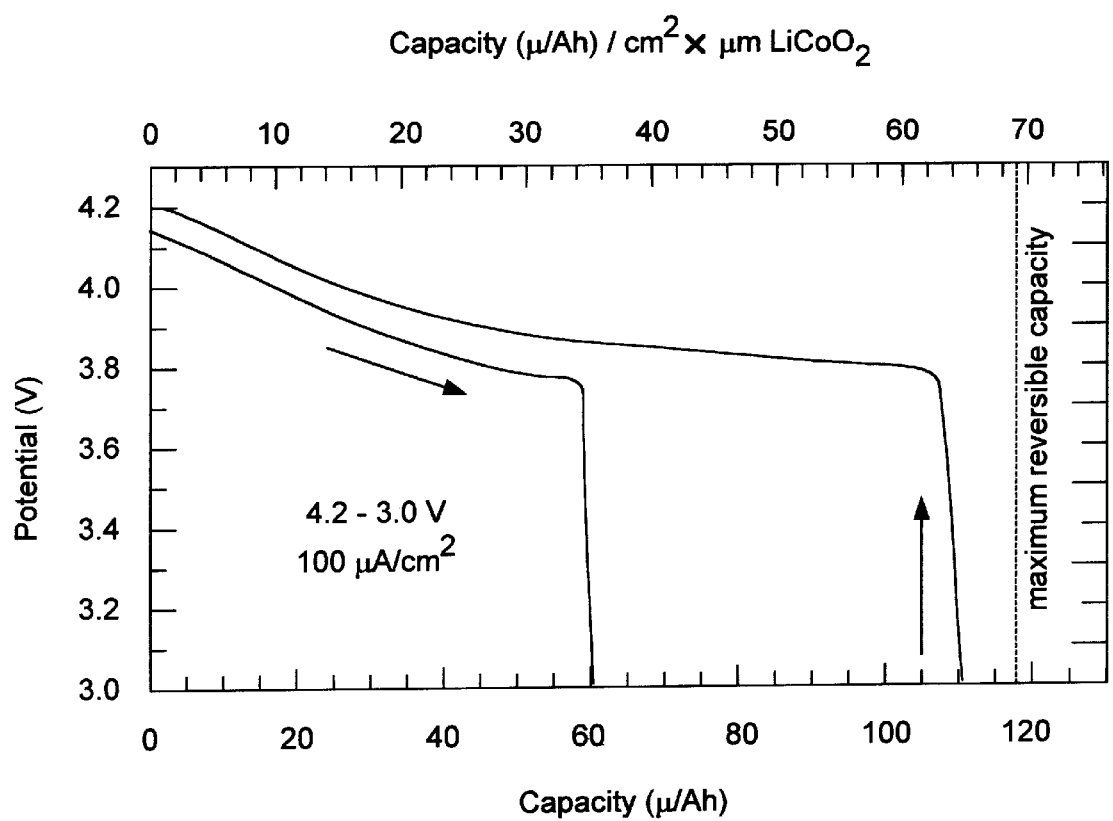
FIG. 4 shows an initial cycle of a thin-film lithium battery with in-situ plated lithium anode, but without the overlayer 8.

FIG. 4 shows that a thin-film battery with an in-situ activation plated lithium anode on a copper anode current collector without the Lipon overlying layer loses almost 50% of its initial charge capacity during the first discharge. The battery evaluated in FIG. 4 includes a 1 cm$^2$ 1500 ÅCu/2 $\mu$m Lipon/1.7 $\mu$m LiCoO$_2$ battery without a Lipon overlying layer.

Figure 5:
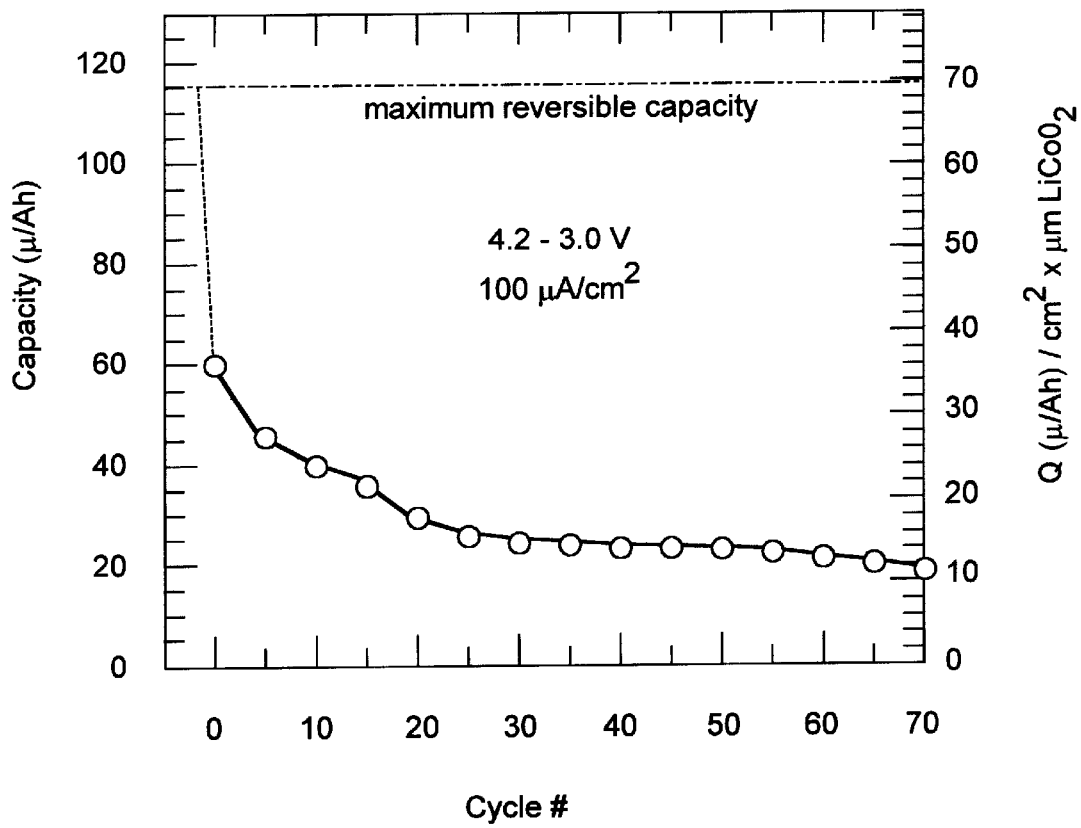
FIG. 5 shows the cyclical performance of the battery given in FIG. 4.

Over the next 70 cycles, the cycling performance of the battery without the Lipon overlying layer deteriorates dramatically as shown by FIG. 5. FIG. 5 shows the cycling performance of a 1 cm$^2$ 1500 $\mu$Cu/2 $\mu$m Lipon/1.7 $\mu$/m LiCoO$_2$ battery without the Lipon overlying layer. FIGS. 4–5 clearly identify the benefit of the above-mentioned Lipon overlying layer which enables the battery to reversibly plate and strip metallic lithium in a controlled fashion.

The benefit of the Lipon overlying layer is further corroborated by the observation made under a scanning electron microscope that the top surface of the battery with an in-situ activation plated lithium anode remains smooth after 1000 cycles. In contrast, batteries without the Lipon overlying layer show a very rough surface consisting of the anode current collector and mossy metallic lithium, after only a few cycles.

Example 2

Cobalt Anode Current Collector

Figure 6:
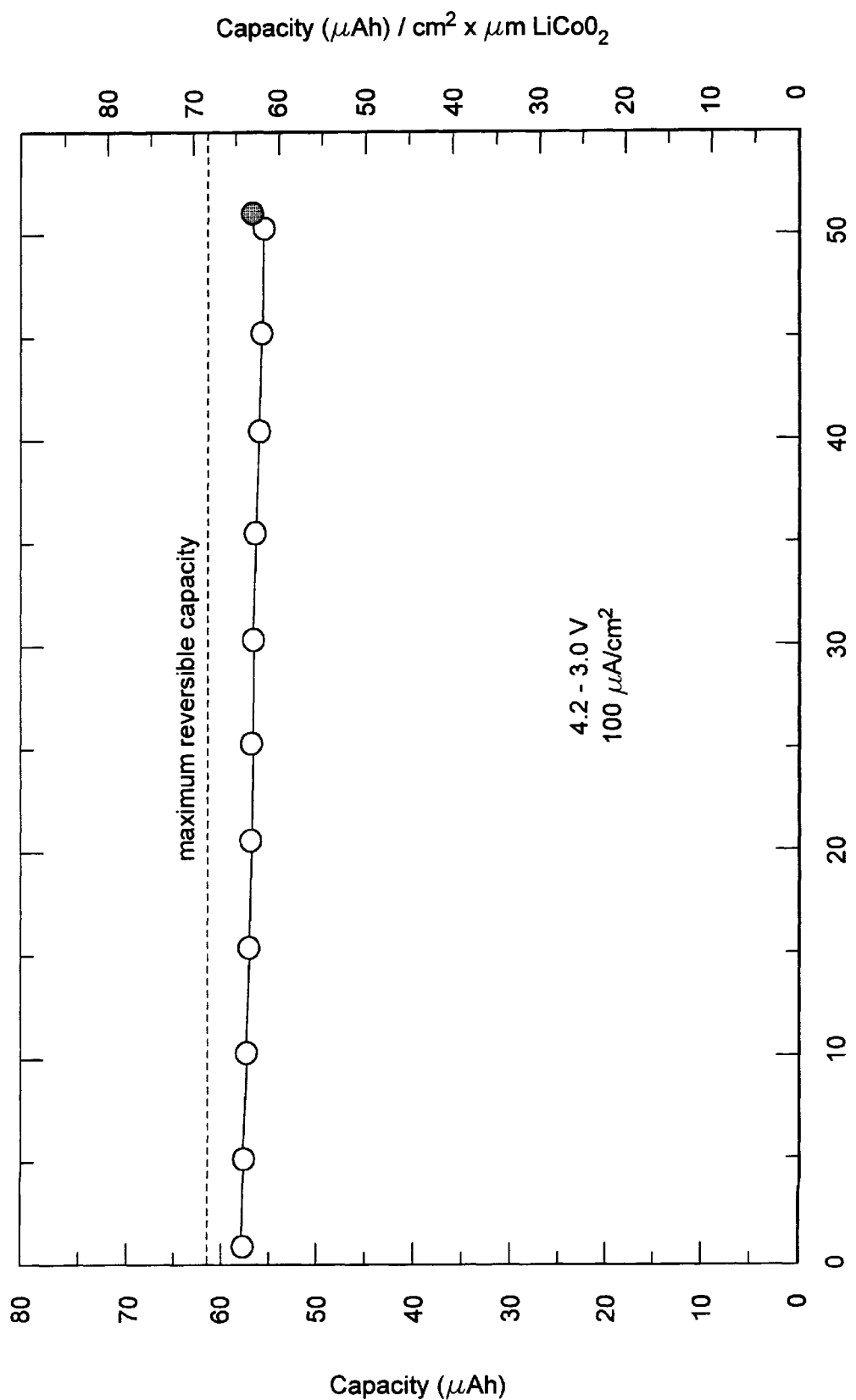
FIG. 6 shows the cyclical performance of another battery having an in-situ plated lithium anode representing an embodiment of the invention.

FIG. 6 shows the cyclical performance of a second example of the battery with an in-situ activation plated lithium anode. The second example has an area of 1 cm$^2$ and a construction of 1 $\mu$m Lipon/1000 $\mu$Co/2 $\mu$m Lipon/0.9 $\mu$m LiCoO$_2$. In the voltage range of 4.2 to 3.0 volts, virtually all of the reversible cycled lithium was stripped from and re-plated underneath the cobalt anode current collector during discharge and charge of the battery, respectively. The capacity supplied at 5 $\mu$A/cm$^2$ between 4.2 to 3.0 volts (full circle at cycle no. 52) nearly yields the maximum reversible capacity of a battery equipped with a 1 cm$^2$×0.9 micron large LiCoO$_2$ cathode, which is indicated in FIG. 6 for comparison.

Practical Applications of the Invention

A practical application of the invention that has value within the technological arts is to generally replace conventional thin-film rechargeable lithium batteries where the lithium anode is deposited in a separate fabrication step, such as thermal evaporation of lithium metal in a vacuum of 10$^{-6}$ mbar or better. In contrast to conventional thin-film lithium batteries, the battery of the present invention can be integrated into electronic circuit boards using the solder re-flow technique. There are virtually innumerable uses for the invention, all of which need not be detailed here.

Advantages of the Invention

Because stripping of the entire metallic lithium anode is substantially reversible, the battery with an in-situ activation plated anode cannot be over-discharged, even if shorted. By fully discharging, the battery with an in-situ activation plated anode can be returned to its as-fabricated state at any time after the initial charge.

Hermetically sealing of the battery inside a plastic bag or directly applying a protective coating to the battery with an in-situ activation plated anode gives the battery a long shelf life. The plastic bag or the protective coating is preferably substantially impervious to moisture and does not react with the overlying layer.

Because the battery with an in-situ activation plated anode has no anode in the as-fabricated state, high capacity loss during the initial charge, which is a major problem for lithium ion thin-film batteries, is eliminated. Also, the battery with an in-situ activation plated anode eliminates the drawbacks of a lithium thin-film battery, which include the need to prepare a lithium metal film, high air-sensitivity at all times, and unsuitability for solder re-flow processing.

The battery overcomes the inherent problems of the lithium-ion battery and the lithium battery that are outlined above. The battery can be handled and processed as a lithium ion or an "anode-less" lithium battery prior to the initial charge. The battery can be handled and processed as a lithium ion or an "anode-less" lithium battery after charging, provided the plated lithium has been completely stripped from the anode current collector. During electrochemical cycling, however, the battery operates as a lithium battery and utilizes the amount of lithium that is supplied by the cathode. The battery exceeds the requirements for the solder re-flow process, showing no signs of degradation in cell performance after being heated at 250° C. in air for 10 minutes.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Further, the individual components need not be fabricated from the disclosed materials, but could be fabricated from virtually any suitable materials. Further, although the battery described herein can be a physically separate module, it will be manifest that the battery with an in-situ activation plated anode may be integrated into the apparatus with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended subclaims.

What is claimed is:

1. A thin-film rechargeable battery, comprising:

a cathode film including a lithium transition metal oxide;

an electrolyte film coupled to the cathode film, the electrolyte film being substantially non-reactive with oxidizing materials and with metallic lithium;

an anode current collector, which substantially avoids formation of inter-metallic compounds with lithium, is coupled to the electrolyte film; and an overlying layer, which is substantially non-reactive with lithium, coupled to the anode current collector, wherein the thin-film rechargeable battery is activated during a charge by electrochemical plating of a metallic lithium anode between the anode current collector and the electrolyte film.

2. The thin-film rechargeable battery of claim 1, wherein the overlying layer, the anode current collector, and the electrolyte film provide:

substantially reversible stripping of the metallic lithium anode during a first discharge of the thin-film rechargeable battery;

electrochemical plating of a plurality of subsequently plated metallic lithium anodes during corresponding charges of the thin-film rechargeable battery, the plating of each of the subsequently plated metallic lithium anodes occurring after a corresponding discharge of the thin-film rechargeable battery; and substantially reversible stripping of the subsequently plated metallic lithium anodes during subsequent discharges of the thin-film rechargeable battery.

3. The thin-film rechargeable battery of claim 1, wherein the overlying layer, the anode current collector and the electrolyte film are configured to confine the metallic lithium anode.

4. The thin-film rechargeable battery of claim 1, further comprising:

a cathode current collector coupled to the cathode film; and a substrate coupled to the cathode current collector.

5. The thin-film rechargeable battery of claim 1, wherein the overlying layer acts as an insulator;

provides an impervious barrier to atomic lithium transport; and is responsive to the electrochemical plating of a metallic lithium anode so as to maintain a substantially flat surface.

6. The thin-film rechargeable battery of claim 1, wherein the overlayer includes at least one material selected from the group consisting of lithium phosphorus oxynitride, aluminium nitride, BeO, MgO, CaO, SrO, BaO, BN, AlN, $SiO_2$, $Si_3N_4$, $Si_2N_2O$, $Sc_2O_3$, $Y_2O_3$, $La_2O_3$, $ThO_2$, $Li_2Be_2O_3$, $Li_4BeO_3$, $Li_5AlO_4$, $Li_4SiO_4$ $Li_8SiO_6$, $LiScO_2$, $LiYO_2$, $Li_8ZrO_6$, $LiCeO_2$, LiF, LiCl, LiBr, LiI, Be, Zr, Ta, W, polytetrafluoroethylene, polyethylene, and parylene.

7. The thin-film rechargeable battery of claim 1, wherein:

the electrolyte film comprises lithium phosphorus oxynitride having a thickness of from approximately 1 to approximately 2 microns; and the overlying layer comprises lithium phosphorus oxynitride having a thickness of from approximately 0.1 to approximately 3.0 microns.

8. The thin-film rechargeable battery of claim 1, having less than five percent discharge capacity loss after:

heating at approximately 250° C. for approximately ten minutes prior to the initial charge; and at least fifty charge and discharge cycles in a voltage range of from approximately 4.5 to approximately 2.5 volts.

9. The thin-film rechargeable battery of claim 1, wherein:

the cathode film has a thickness in a range from approximately 0.01 to approximately 5.0 microns; and the lithium transition metal oxide comprises lithium and oxygen, and at least one element selected from the groups consisting of columns IB-VIII B of the periodic table.

10. The thin-film rechargeable battery of claim 1, further comprising a protective coating coupled to the overlying layer, the protective coating being substantially impervious to moisture and substantially nonreactive with the overlying layer.

11. The thin-film rechargeable battery of claim 1, wherein:

the anode current collector has a thickness of from approximately 0.05 to approximately 2 microns; and the anode current collector includes at least one member selected from the group consisting of scandium, titanium, vanadium, chromium, manganese, iron, cobalt, nickel, copper, yttrium, zirconium, lanthanum, hafnium, molybdenum, tantalum, tungsten, and titanium nitride.

12. The thin-film rechargeable battery of claim 2, wherein the overlying layer accommodates volume changes during the reversible stripping and the electrochemical plating.

13. The thin-film rechargeable battery of claim 4, wherein the cathode current collector:

includes a noble metal; and has a thickness in the range of from approximately 0.02 to approximately 1 micron.

* * * * *

UNITED STATES PATENT AND TRADEMARK OFFICE
CERTIFICATE OF CORRECTION

PATENT NO. : 6,168,884 B1
DATED : January 2, 2001
INVENTOR(S) : Bernd J. Neudecker; Nancy J. Dudney; and John B. Bates It is certified that error appears in the above-identified patent and that said Letters Patent is hereby corrected as shown below:

In the Drawings:

In FIG. 2, please delete "Capacity ($\mu$/Ah) / $cm^2$ x $\mu m$ $LiCoO_2$" and insert therefor --Capacity ($\mu$/Ah / $cm^2$ x $\mu m$ $LiCoO_2$)--.

In FIG. 3, please delete "Capacity ($\mu$/Ah) / $cm^2$ x $\mu m$ $LiCoO_2$" and insert therefor --Capacity ($\mu$/Ah) / $cm^2$ x $\mu m$ $LiCoO_2$)--.

In FIG. 4, at the top, please delete "Capacity ($\mu$/Ah) / $cm^2$ x $\mu m$ $LiCoO_2$" and insert therefor
-- Capacity ($\mu Ah$ / $cm^2$ x $\mu m$ $LiCoO_2$)--.

In FIG. 4 near the bottom, please delete "Capacity ($\mu$/Ah)" and insert therefor -- Capacity ($\mu Ah$)--.

In FIG. 5, at the right, please delete "Q ($\mu Ah$) / $cm^2$ x $\mu m$ $LiCoO_2$" and insert therefor --Q ($\mu Ah$ / $cm^2$ x $\mu m$ $LiCoO_2$)--.

In FIG. 5, at the left, please delete "Capacity ($\mu Ah$)" and insert therefor –Capacity ($\mu Ah$)--.

In FIG. 6, please delete "Capacity ($\mu Ah$) / $cm^2$ x $\mu m$ $LiCoO_2$" and insert therefor --Capacity ($\mu Ah$ / $cm^2$ x $\mu m$ $LiCoO_2$)--.

UNITED STATES PATENT AND TRADEMARK OFFICE
CERTIFICATE OF CORRECTION

PATENT NO. : 6,168,884 B1
DATED : January 2, 2001
INVENTOR(S) : Bernd J. Neudecker; Nancy J. Dudney; and John B. Bates It is certified that error appears in the above-identified patent and that said Letters Patent is hereby corrected as shown below:

In Col. 2, on or near line 46, please delete "8" and insert therfor --6--.

In Col. 6, on or near line 15, please delete "(4.2-2.5v)" and insert therefor --(4.2-2.5V)-- and delete "(3.6-2.5v)" and insert therefor -- (3.6-1.5V)--.

In Col. 6, line 53, please delete "69 µA/h," and insert therefor --69 µA/h--.

In Col. 7, line 41, please delete "Lipon/1000 µCo/2µm," and insert therefor -- Lipon/1000 Å Co/2µm--.

Signed and Sealed this

Twenty-sixth Day of June, 2001

*Attest:*

*Attesting Officer*

NICHOLAS P. GODICI
*Acting Director of the United States Patent and Trademark Office*